US006801515B1

(12) United States Patent
Ishikawa et al.

(10) Patent No.: US 6,801,515 B1
(45) Date of Patent: Oct. 5, 2004

(54) CALL ACCEPTANCE CONTROL METHOD FOR CDMA MOBILE RADIO COMMUNICATION SYSTEM AND MOBILE STATION DEVICE

(75) Inventors: Yoshihiro Ishikawa, Kanagawa-ken (JP); Yasuyuki Watanabe, Kanagawa-ken (JP); Takaaki Sato, Kanagawa-ken (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/125,784
(22) PCT Filed: Dec. 25, 1997
(86) PCT No.: PCT/JP97/04827
§ 371 (c)(1), (2), (4) Date: Aug. 27, 1998
(87) PCT Pub. No.: WO98/30057
PCT Pub. Date: Jul. 9, 1998

(30) Foreign Application Priority Data

Dec. 27, 1996 (JP) .............................................. 8-351273
Jul. 29, 1997 (JP) .............................................. 9-203435

(51) Int. Cl.$^7$ .............................................. H04B 7/216
(52) U.S. Cl. .................................... 370/342; 455/452.2
(58) Field of Search ................................. 370/328, 331, 370/332, 333, 335, 342, 230, 329, 252; 455/437, 436, 432, 445, 450, 452.2

(56) References Cited

U.S. PATENT DOCUMENTS 5,448,761 A * 9/1995 Ushirokawa ................. 455/62
5,491,717 A * 2/1996 Hall ............................ 370/205
5,530,917 A    6/1996 Andersson et al.

(List continued on next page.)

FOREIGN PATENT DOCUMENTS

| EP | 0 708 572 | 4/1996 |
| JP | 4-286432 | 10/1992 |
| JP | 8-168070 | 6/1996 |
| WO | WO 94/05130 | 3/1994 |
| WO | WO 96/37083 | 11/1996 |

OTHER PUBLICATIONS

A. M. Viterbi, et al., IEEE Journal on Selected Areas in Communications, vol. 11, No. 6, pp. 892–900, "Erlang Capacity of a Power Controlled CDMA System", Aug. 1993.

(List continued on next page.)

*Primary Examiner*—Dang Ton
*Assistant Examiner*—Phuc Tran
(74) *Attorney, Agent, or Firm*—Oblon, Spivak, McClelland, Maier & Neustadt, P.C.

(57) ABSTRACT

A call admission control method and a mobile station device for a CDMA mobile communication system which is capable of not damaging a communication quality of a mobile station in communication even under a situation of large traffic, suppressing a possibility for degrading a communication qualities of mobile stations in communication with surrounding base stations sufficiently low, and improving efficiency without increasing the control signal traffic. A radio base station device measures an uplink interference amount and broadcasts it to a mobile station, and the mobile station acquires the uplink interference amount that is broadcast from the base station, calculates a required receiving level at the base station that is expected in a case where it is admitted to a connection target base station according to said acquired uplink interference amount, and judges that admission of the mobile station is refused in a case where it is judged that a prescribed communication quality cannot be satisfied according this calculated required receiving level and the uplink interference amount.

17 Claims, 9 Drawing Sheets

U.S. PATENT DOCUMENTS

| | | | | |
|---|---|---|---|---|
| 5,666,356 A | * | 9/1997 | Fleming et al. | 370/328 |
| 5,752,193 A | * | 5/1998 | Scholefield et al. | 455/452 |
| 5,815,801 A | * | 9/1998 | Hamalainen et al. | 370/335 |
| 5,826,169 A | * | 10/1998 | Natarjan | 370/316 |
| 5,832,368 A | * | 11/1998 | Nakano et al. | 455/63 |
| 5,838,671 A | * | 11/1998 | Ishikawa et al. | 370/335 |
| 5,845,212 A | * | 12/1998 | Tanaka | 455/437 |
| 5,862,124 A | * | 1/1999 | Hottinen et al. | 370/335 |
| 5,886,988 A | * | 3/1999 | Yun et al. | 370/329 |
| 5,901,145 A | * | 5/1999 | Sawyer | 370/332 |
| 6,028,851 A | * | 2/2000 | Persson et al. | 370/329 |
| 6,038,448 A | * | 3/2000 | Chheda et al. | 370/436 |
| 6,078,570 A | * | 6/2000 | Czaja et al. | 370/331 |
| 6,167,035 A | * | 12/2000 | Veeravalli et al. | 370/331 |

OTHER PUBLICATIONS

Zhao Liu, et al., IEEE Journal on Selected Areas in Communications, vol. 12, No. 4, pp. 638–644, "Sir–Based Call Admission Control for DS–CDMA Cellular Systems", May 1, 1994.

Chih–Lin I, et al., Global Telecommunications Conference, pp. 235–241, "Load and Interference Based Demand Assignment (LIDA) For Integrated Services in CDMA Wireless Systems", Nov. 18, 1996.

Michel Mouly, et al., Cell & Sys., pp. 441–442, "The GSM System for Mobile Communications", 1992.

Audrey M. Viterbi, et al., IEEE Journal on Selected Areas in Communications, vol. 11, No. 6, pp. 892–900, "Erlang Capacity of a Power Controlled CDMA System", Aug. 1993.

* cited by examiner

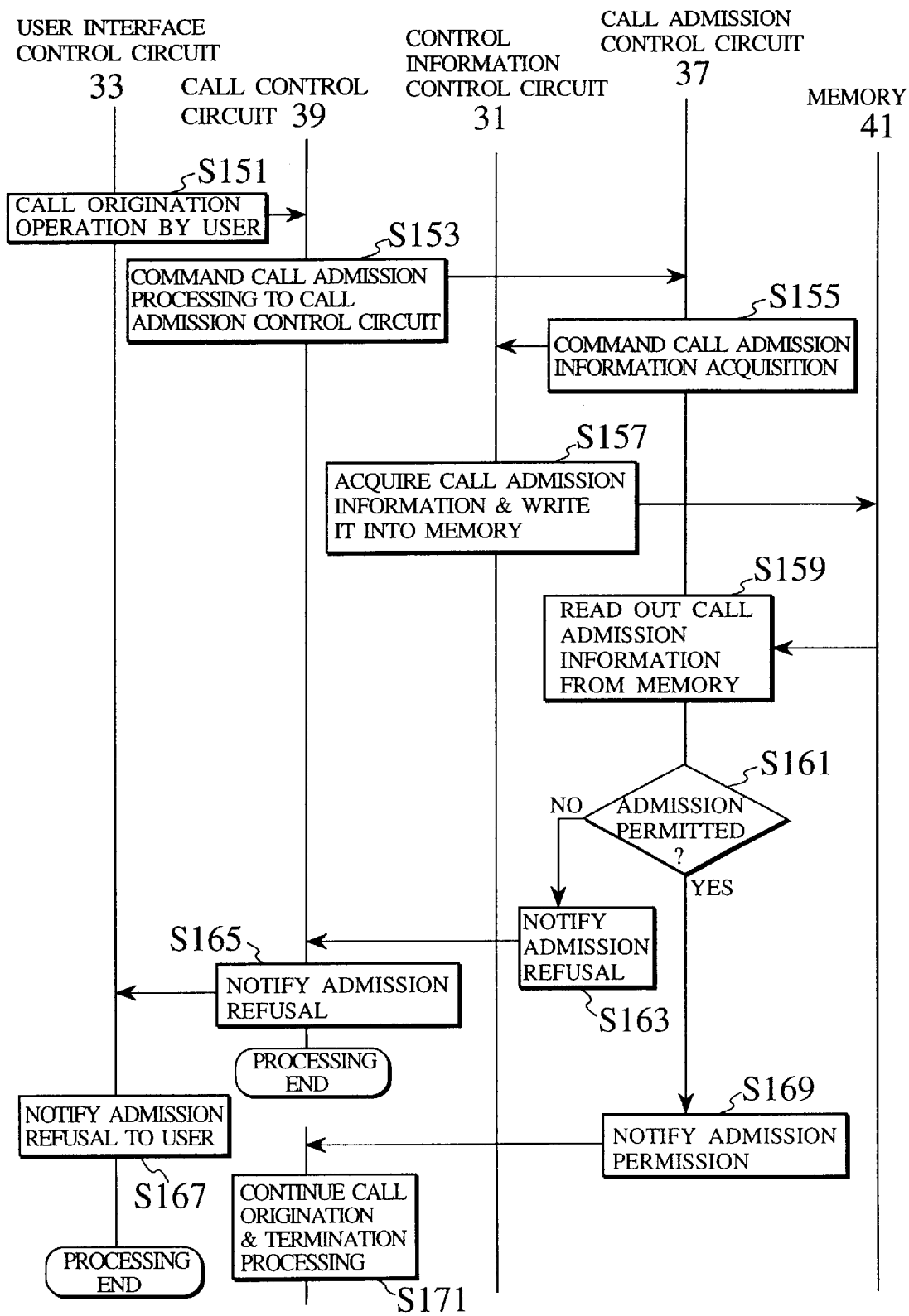

CALL ACCEPTANCE CONTROL METHOD FOR CDMA MOBILE RADIO COMMUNICATION SYSTEM AND MOBILE STATION DEVICE

TECHNICAL FIELD

The present invention relates to a call admission control method and a mobile station device for a CDMA mobile communication system that control admission of calls for a frequency bandwidth shared by a plurality of mobile stations which carry out communications with a plurality of radio base stations by a code division multiple access (abbreviated hereafter as CDMA) scheme.

BACKGROUND ART

In the currently spread mobile communication system such as portable telephone and automobile telephone, a service is provided by dividing an entire service area into relatively small radio zones called cells. Such a scheme is called a cellular scheme, and a radius of one cell is set to be about 1 to 2 km, for example. By repeatedly reusing the same radio channel geographically, there are advantages such as that a system subscriber capacity can be increased, and that communications can be carried out in good communication quality even by a mobile station with a relatively small transmission power such as a portable telephone terminal because a probability for having a radio base station existing in a short distance from a mobile station becomes high.

In general, in the mobile communication system, there is a limit to the capacity of subscribers that can be accommodated in the system because available radio resources are limited. Consequently, when communication requests in excess of this capacity occur, the so called call loss in which the service providing is refused occurs.

In the conventional FDMA (Frequency Division Multiple Access) or TDMA (Time Division Multiple Access) system in which radio channels are fixedly provided, radio channels to be provided at each radio base station are determined such that there is a sufficiently low probability for having an interference blocking from the identical channel or an interference blocking from neighboring radio channels in the interleave scheme in which radio channels are formed by allowing overlaps in side band power of radio channels. The number of mobile stations that can simultaneously communicate at that radio base station is limited by the number of radio channels provided at that radio base station, and the case of having communication requests in excess of the number of radio channels will result in the call loss. In such a system, the number of channels is allocated to each base station so that there is a drawback in that it is difficult to flexibly deal with uneven distribution or variation in time of traffics.

Also, in the system using the so called dynamic channel allocation in which radio channels are dynamically allocated, a method for selectively allocating radio channels that satisfy a required communication quality at a time of radio channel allocation has been adopted. For example, there are a method in which allocation is permitted when an interference amount is less than or equal to a specified value and a method in which allocation is permitted when a CIR (Carrier to Interference power Ratio) is greater than or equal to a specified value. In this case, the case where the transmission and reception devices provided at each base station are all in use or the case where there is an idle transmission and reception device but no radio channel that satisfies the required communication quality will result in the call loss.

On the other hand, the CDMA scheme is a scheme in which the same radio frequency bandwidth is shared as respective users use different spread codes, and channels are formed by spread codes. In the communication system using this CDMA scheme, all other communications that use the same frequency bandwidth become interferences. Namely, when the same frequency bandwidth is used at all cells, quite many communications at all cells become interference sources so that the communication quality is determined by a total interference amount regardless of which spread codes are used for communications by respective users.

Consequently, there is a problem that the communication quality cannot be guaranteed in the CDMA system by the method which selects a radio channel that satisfies a channel reuse distance or a required communication quality, as has been carried out in the conventional FDMA or TDMA system.

For this reason, there is a need to suppress the number of interference sources itself in order to guarantee the communication quality in the CDMA system. As a technique for suppressing the interference amount, various techniques such as the sectorization, voice activation, etc., are known, but in order to suppress the interference amount less than or equal to a reference value when their conditions are given, it is necessary to limit the number of users who make connections simultaneously.

From these viewpoints, Japanese Patent Application No. 7-759 (1995) discloses a call admission control method for the purpose of guaranteeing the communication quality in the CDMA scheme. Also, Japanese Patent Application No. 7-326056 (1995) discloses a method for judging call admission permission/refusal by measuring an uplink interference amount at a radio base station and comparing the measurement result and a predetermined threshold, and a method for setting up the threshold.

Japanese Patent Application No. 7-759 (1995) is characterized in that, upon newly admitting a call, when the communication qualities of a mobile station corresponding to that call and mobile stations already connected to that radio base station are estimated by referring to the interference amount at a time of newly admitting a call that is estimated according to the past data, if it is estimated that there exists a mobile station that cannot satisfy the prescribed communication quality, the admission of this new call is refused.

Also, Japanese Patent Application No. 7-326056 (1995) obtains the maximum offered traffic in a given frequency bandwidth in order to guarantee the required communication quality and satisfy the prescribed call loss rate, from the first relationship between the offered traffic and the threshold of the interference amount for the call admission in order to guarantee the required communication quality which is obtained according to the communication quality degradation rate and the second relationship between the offered traffic and the threshold of the interference amount for the call admission in order to satisfy the required call loss rate which is obtained according to the call loss rate, and controls admission of a new call by determining the threshold of the interference amount for the call admission in that frequency bandwidth in order to satisfy the required call loss rate with respect to the offered traffic within a range of this maximum offered traffic according to said second relationship.

However, these call admission control methods make the judgement of admission permission/refusal at a radio base station, so that they have a serious, practically unfavorable drawback that an increase in the control signal amount between the radio base station and the mobile station is caused especially when the traffic is large at that radio base station. This is generally due to the occurrence of a phenomenon called re-calling in which users who were not connected as it was judged that admission is refused will repeat the call origination operation successively. Usually, in order to originate a call, an access is made from a mobile station to a radio base station by using a channel that is commonly used by respective users. When many users for which it was judged that admission is refused repeat the call origination operation successively, it causes a vicious circle in which the traffic of this common channel increases abruptly so that a probability for being admitted becomes even lower. In the CDMA, when the same radio frequency bandwidth is used for this common channel and communication channels, there has been a problem that it does not stop to be just a problem of lowering of efficiency in the common channel and it also causes the degradation of the communication quality as these control signals become large interferences even with respect to mobile stations in communications.

Moreover, in the methods disclosed in Japanese Patent Application No. 7-326056 (1995) and Japanese Patent Application No. 7-759 (1995), the judgement of call admission permission/refusal is made closedly at one radio base station, so that there has been a serious, practically unfavorable problem that a mobile station that is admitted to that radio base station gives a large interference to the surrounding radio base stations and as a result it is impossible to suppress the possibility for degrading the communication qualities of mobile stations which are carrying out communications by making connections to the surrounding base stations.

DISCLOSURE OF THE INVENTION

The object of the present invention is to provide a call admission control method and a mobile station device for a CDMA mobile communication system which is capable of not damaging a communication quality of a mobile station in communication even under a situation of large traffic, suppressing a possibility for degrading a communication qualities of mobile stations in communication with surrounding base stations sufficiently low, and improving efficiency without increasing the control signal traffic between the base station and the mobile station, between the base station and surrounding base stations, and between the base station and an upper level control station.

The present invention is a call admission control method for a CDMA mobile communication that controls admission of calls for a frequency bandwidth shared by a plurality of mobile stations which carry out communications with radio base stations by a code division multiple access, in which a radio base station broadcasts a call admission information indicating a state of own station regarding admission of a new call using a broadcast channel, and a mobile station acquires said call admission information which is broadcast from a connection target radio base station through the broadcast channel, and judges admission permission/refusal of said mobile station according to this acquired call admission information.

In this way, it is possible to reduce the control signal traffic between the base station and the mobile station, while preventing degradation of communication qualities of users who are already connected with the connection target base station and in communication.

Also, in another aspect of the present invention, the mobile station acquires the call admission information at respective radio base stations which are broadcast from surrounding radio base stations of the connection target radio base station through broadcast channels transmitted by respective radio base stations, and uses these acquired call admission information in judging admission permission/refusal of said mobile station in addition.

In this way, it is possible to further reduce the control signal traffic between the base station and the mobile station, while preventing degradation of communication qualities of users who are already connected with the connection target base station and in communication.

Also, in another aspect of the present invention, the call admission information indicates either permission or refusal regarding admission of a new call at own radio base station.

Also, in another aspect of the present invention, the radio base station measures an uplink interference amount at own base station, and the call admission information is formed at least by said measured uplink interference amount and a prescribed threshold.

Also, in another aspect of the present invention, the radio base station measures an uplink interference amount at own base station and calculates a remaining capacity at own base station according to this measured uplink interference amount, and the call admission information indicates at least this calculated remaining capacity.

Also, in another aspect of the present invention, the radio base station measures an uplink interference amount at own base station, and the call admission information is formed at least by said measured uplink interference amount at own base station, and the mobile station calculates a required receiving level at the radio base station that is expected in a case where it is admitted to the connection target radio base station, according to the interference amount acquired from the broadcast channel, and judges that admission of said mobile station is refused in a case where it is judged that own station cannot satisfy a required communication quality, according to said acquired uplink interference amount and said calculated required receiving level.

In this way, it is possible to reduce the control signal traffic between the base station and the mobile station, while preventing degradation of communication qualities of users who are already connected with the connection target base station and in communication.

Also, in another aspect of the present invention, the mobile station estimates an uplink interference amount after said mobile station is admitted, from the uplink interference amount at the base station and the required receiving level that is expected in a case where said mobile station is admitted, and judges that admission of said mobile station is refused in a case where this estimated uplink interference amount after admission exceeds a prescribed threshold.

In this way, it is possible to reduce the control signal traffic between the base station and the mobile station, while preventing degradation of communication qualities of users who are already connected with the connection target base station and in communication.

Also, in another aspect of the present invention, the radio base station measures an uplink interference amount at own base station, and the call admission information is formed at least by said measured uplink interference amount at own base station, and the mobile station calculates an interference amount to be given to surrounding base stations that is expected in a case where said mobile station is admitted to the connection target radio base station, according to a required receiving level at the connection target radio base station that is expected in a case where it is admitted to the connection target radio base station, estimates an uplink interference amount at surrounding base stations after said mobile station is admitted to the connection target radio base station, from said acquired uplink interference amount at surrounding base stations, and said calculated interference amount to be given to surrounding base stations, and judges that admission of said mobile station is refused when this estimated uplink interference amount at surrounding base stations exceeds a prescribed threshold.

In this way, it is possible to reduce the control signal traffic between the base station and the mobile station, while preventing degradation of communication qualities of users who are already connected with the connection target base station and in communication.

Also, in another aspect of the present invention, the the radio base station measures a transmission power of own base station, and the call admission information is formed at least by said measured transmission power value of the radio base station and a prescribed threshold.

Also, in another aspect of the present invention, the radio base station measures a transmission power of own base station and calculates a remaining capacity at own base station according to said measured transmission power value of the radio base station, and the call admission information indicates at least this calculated remaining capacity.

Also, in another aspect of the present invention, the call admission information is formed at least by a number of spread codes currently used within own radio base station or a number of hardware resources currently used within own radio base station, and a threshold corresponding to them.

Also, in another aspect of the present invention, the radio base station calculates a remaining capacity at own base station according to a number of spread codes currently used within own radio base station or a number of hardware resources currently used within own radio base station, and the call admission information indicates at least this calculated remaining capacity.

Also, the present invention is a mobile station device in a CDMA mobile communication system for controlling admission of calls for a frequency bandwidth shared by a plurality of mobile stations which carry out communications with radio base stations by a code division multiple access, which has acquisition means for acquiring a call admission information indicating a state regarding admission of a new call at a radio base station which is broadcast from a connection target radio base station through a broadcast channel, judging means for judging admission permission/refusal of said mobile station according to this acquired call admission information, and call processing terminating means for terminating a call processing operation at said mobile station in a case where it is judged that admission is refused as a result of this judging.

In this way, it is possible to reduce the control signal traffic between the base station and the mobile station, while preventing degradation of communication qualities of users who are already connected with the connection target base station and in communication.

Also, in another aspect of the present invention, the acquisition means also acquires the call admission information at respective radio base stations which are broadcast from surrounding base stations of the connection target radio base stations through broadcast channels transmitted by respective base stations.

Also, in another aspect of the present invention, the acquisition means acquires an uplink interference amount from the call admission information which is broadcast from the connection target radio base station, and the judging means calculates a required receiving level at the radio base station that is expected in a case where it is admitted to the connection target radio base station, according to the interference amount acquired from the broadcast channel, and judges that admission of said mobile station is refused in a case where it is judged that own station cannot satisfy a required communication quality, according to said acquired uplink interference amount and said calculated required receiving level.

In this way, it is possible to reduce the control signal traffic between the base station and the mobile station, while preventing degradation of communication qualities of users who are already connected with the connection target base station and in communication.

Also, in another aspect of the present invention, the judging unit estimates an uplink interference amount after said mobile station is admitted, from the uplink interference amount at the base station and the required receiving level that is expected in a case where the mobile station is admitted, and judges that admission of said mobile station is refused in a case where this estimated uplink interference amount after admission exceeds a prescribed threshold.

Also, in another aspect of the present invention, the acquisition means acquires an uplink interference amount at the base station from the call admission information that is broadcast through the broadcast channel, and the judging unit calculates an interference amount to be given to surrounding base stations that is expected in a case where said mobile station is admitted to the connection target radio base station, according to a required receiving level at the connection target radio base station that is expected in a case where it is admitted to the connection target radio base station, estimates an uplink interference amount at surrounding base stations after said mobile station is admitted to the connection target radio base station, from said acquired uplink interference amount at surrounding base stations, and said calculated interference amount to be given to surrounding base stations, and judges that admission of said mobile station is refused when this estimated uplink interference amount at surrounding base stations exceeds a prescribed threshold.

In this way, it is possible to reduce the control signal traffic between the base station and the mobile station, while preventing degradation of communication qualities of users who are already connected with surrounding base stations of the connection target base station and in communication.

BRIEF DESCRIPTION OF THE DRAWINGS

FIG. 9 is a flow chart showing an operation of each circuit within the mobile station.

BEST MODE FOR CARRYING OUT THE INVENTION

In the following, the embodiment of the present invention will be described using drawings.

Figure 1:
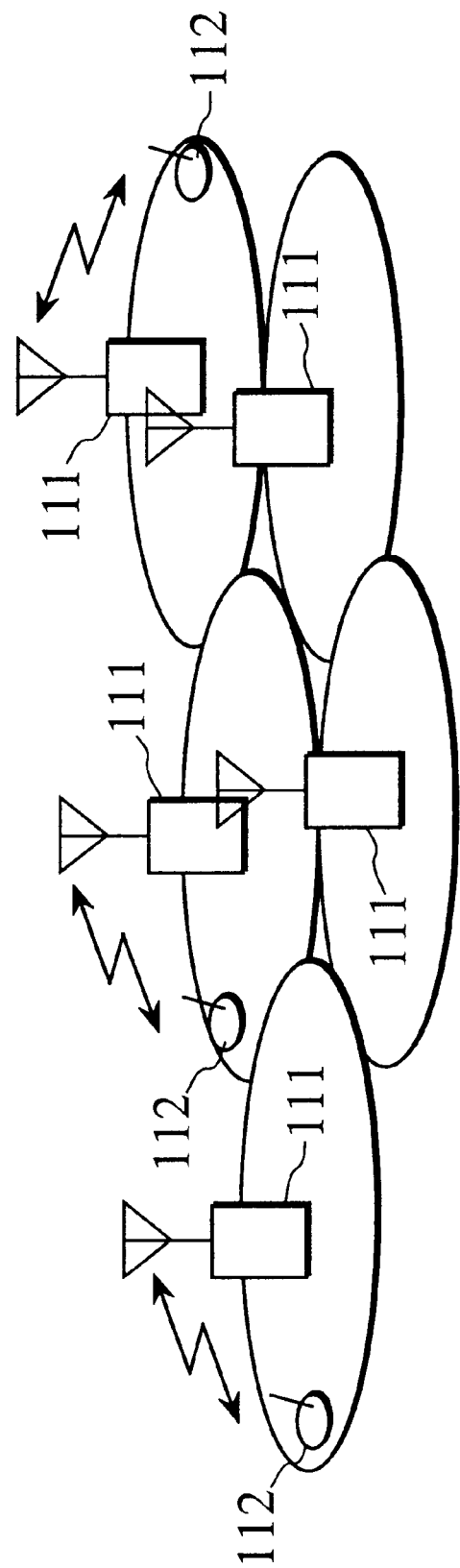
FIG. 1 is a figure showing a configuration of a mobile communication system to which the call admission control method according to one embodiment of the present invention is applied.

FIG. 1 is a figure showing a configuration of a mobile communication system to which the call admission control method according to one embodiment of the present invention is applied. In the mobile communication system shown in the same figure, a radio base station device 111 and a mobile station 112 carry out mutual communications using the CDMA scheme each other.

Figure 2:
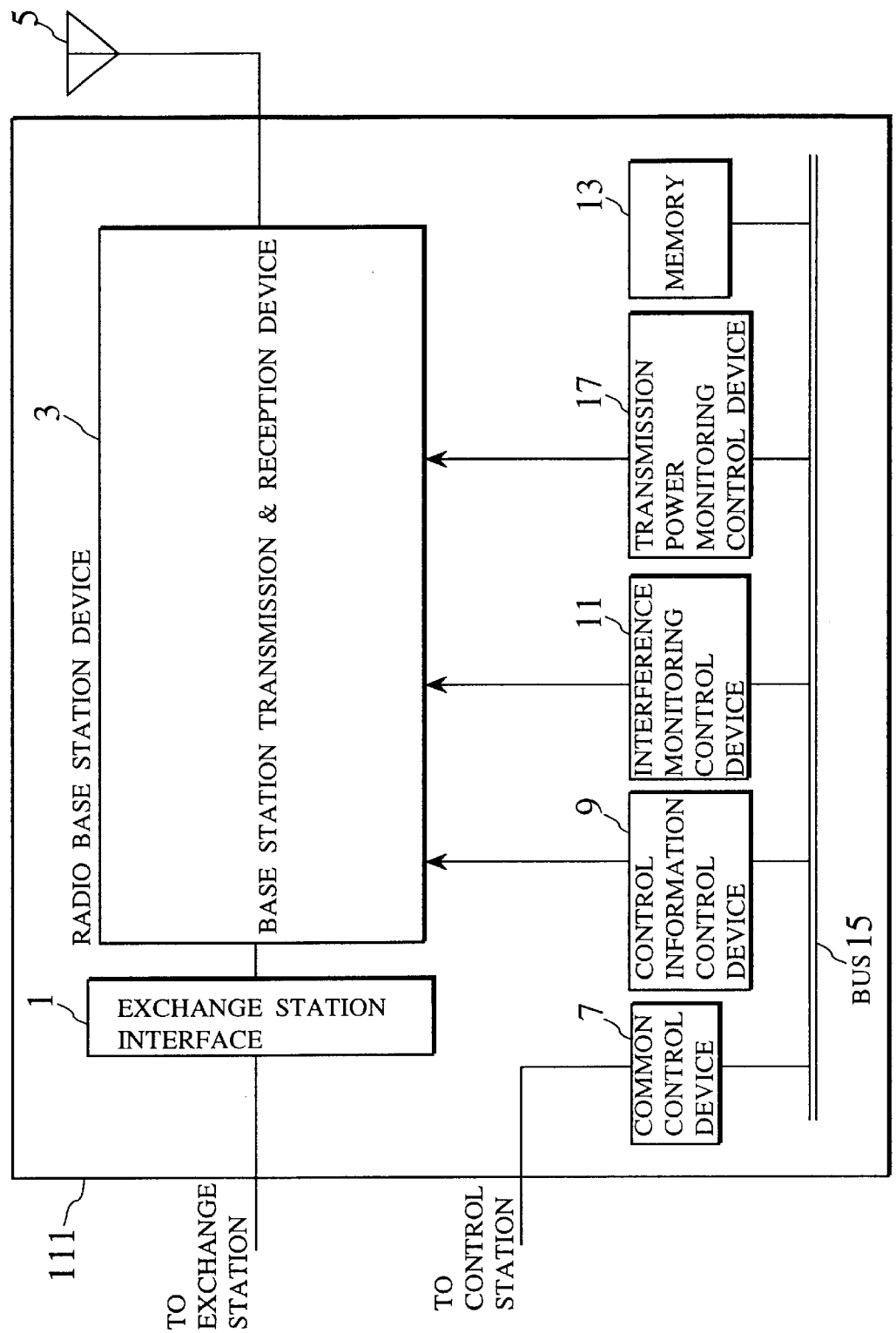
FIG. 2 is a block diagram showing a configuration of a base station device used in the mobile communication system of FIG. 1.

FIG. 2 is a block diagram showing a configuration of a radio base station device 111 shown in FIG. 1. The radio base station device 111 shown in the same figure is connected to an exchange station through an exchange station interface 1 while being connected with the mobile station through an antenna 5, and has a base station transmission and reception device 3 for transmitting and receiving user information through radio, while a common control device 7, a control information control device 9, an interference monitoring control device 11, a memory 13 and a transmission power monitoring control device 17 are mutually connected through a bus 15 as devices for controlling said base station transmission and reception device 3.

Also, The interference monitoring control device 11 commands a measurement of interference amount to the base station transmission and reception device 3, receives its result, and stores it in the memory 13. The control information control device 9 reads out an interference amount information from the memory 13, and controls the base station transmission and reception device 3 so as to broadcast it to the mobile station 112 using the broadcast channel.

Figure 3:
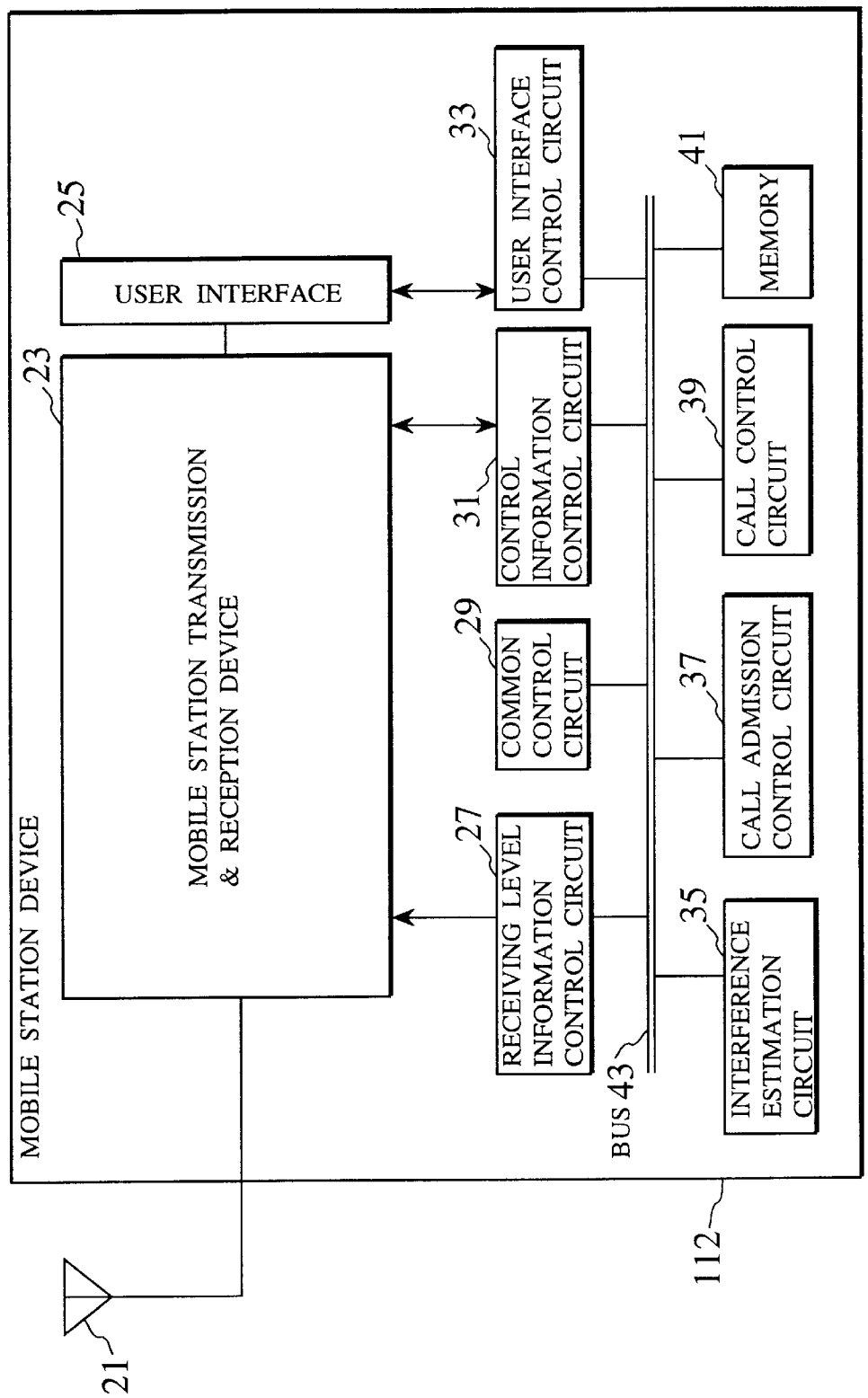
FIG. 3 is a block diagram showing a configuration of a mobile station device used in the mobile communication system of FIG. 1.

FIG. 3 is a block diagram showing a configuration of the mobile station device 112 shown in FIG. 1. The mobile station device 112 shown in the same figure is connected to a user interface 25 while being connected with the base station through an antenna 21, and has a mobile station transmission and reception device 23 for transmitting and receiving user information through radio while a receiving level information control circuit 27, a common control circuit 29, a control information control circuit 31, a user interface control circuit 33, an interference estimation circuit 35, a call admission control circuit 37, a call control circuit 39, and a memory 41 are mutually connected through a bus 43 as circuits for controlling said mobile station transmission and reception device 23.

The control information control circuit 31 takes out an information that is broadcast from the radio base station device 111 using the broadcast channel, and stores it in the memory 41. The user interface control circuit 33 is a circuit for controlling the user interface 25, which is a circuit for interpreting commands from a user and notifying processing results to a user. The interference estimation circuit 35 is a circuit for carrying out an estimation calculation of an uplink interference amount after own mobile station is admitted. The call admission control circuit 37 is a circuit for judging call admission permission/refusal, which is activated by a command of the call control circuit 39. The call control circuit 39 is a circuit for carrying out a call control such as call origination and call termination of the mobile station. The receiving level information control circuit 27 commands to the mobile station transmission and reception device 23 a measurement of a receiving level of a control channel which is transmitted by the radio base station, and also stores its result in the memory 41.

Figure 4:
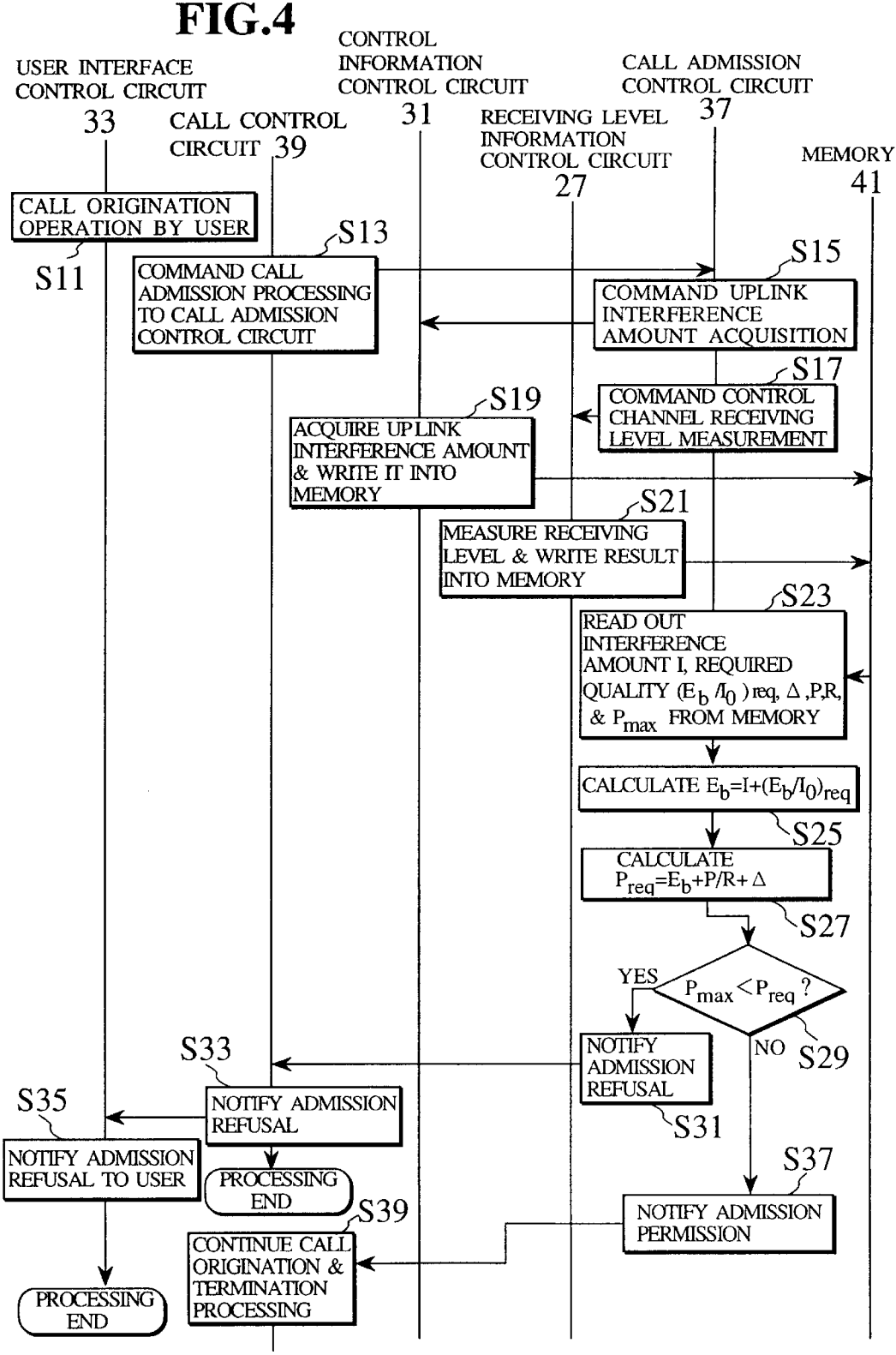
FIG. 4 is a flow chart showing an operation of the mobile station device.

Next, the processing at the mobile station for calculating the required receiving level, judging whether the own station can satisfy the required communication quality or not according to that, and judging admission permission/refusal of the own station will be described. FIG. 4 is a flow chart showing an operation of each circuit within the mobile station, which is showing the case of call origination from the mobile station. In the case of call termination to the mobile station, there are differences such as what activates the call control circuit 39 is not the user interface control circuit 33 but the control information control circuit 31 which detected the paging to the own station, yet a portion related to the call admission permission/refusal judgement is applicable without any change at all, so that the description will be given using an example of the mobile station call origination.

In FIG. 4, when the user interface control circuit 33 detects the call origination operation by the user, the user interface control circuit 33 commands the execution of the call control to the call control circuit 39 (step S11).

Before executing the control control, the call control circuit 39 commands the call admission processing to the call admission control circuit 37 (step S13).

The call admission control circuit 37 commands the uplink interference amount acquisition and the control channel receiving level measurement to the control information control circuit 31 and the receiving level information control circuit 27 respectively (steps S15, S17). The control information control circuit 31 and the receiving level information control circuit 27 that received commands from the call admission control circuit 37 execute the uplink interference amount acquisition and the control channel receiving level measurement respectively, and store the results in the memory 41 (steps S19, S21). After waiting until these are finished, the call admission control circuit 37 reads out from the memory 41 the uplink interference amount I and the control channel receiving level R, as well as a required quality $(E_b/I_0)_{req}$, a transmission power P of the control channel, a margin $\Delta$ for the sake of call admission, and a maximum transmission power $P_{max}$ of the own station (step S23). The call admission control circuit 37 calculates a required energy per bit $E_b$ (required receiving power level) after the own station is admitted, as follows (step S25).

$$E_b = I + (E_b/I_0)_{req} \quad (1)$$

In addition, the propagation loss between the base station and the mobile station is estimated as P/R, for example, and a required transmission power $P_{req}$ after the own station is admitted is calculated as:

$$P_{req} = E_b + P/R + \Delta \quad (2)$$

(step S27). $\Delta$ is a margin for the sake of call admission as mentioned above. In the actual mobile communication system, due to the fact that the receiving level measurement value R contains an error and further the fact that characteristics of the uplink propagation path and the downlink propagation path are different in general, $P_{req}$ is also going to contain an error. If $P_{req}$ is evaluated to be smaller, the so called forced disconnection in which a channel is disconnected by force will occur as the required quality cannot be satisfied actually despite of the fact that it is judged as admission permitted by the call admission judgement. The forced disconnection lowers the service performance considerably, so that a margin is introduced in this manner in the present embodiment. However, this does not limit the embodiment of the present invention.

This $P_{req}$ is compared with the maximum transmission power $P_{max}$ of the own station (step S29), and if $P_{max} < P_{req}$, that is, if it is judged that the required quality cannot be satisfied even by the transmission at the maximum transmission power of the own station, the call admission control circuit 37 notifies the admission refusal to the call control circuit 39 (step S31), and further the call control circuit 39 notifies the admission refusal to the user interface control circuit 33 (step S33). The user interface control circuit 33 notifies the admission refusal to the user through the user interface 25 (step S35). If $P_{max} \geq P_{req}$, the call admission control circuit 37 notifies the admission permission to the call control circuit 39 (step S37). The call control circuit 39 continues the call origination and termination processing (step S39).

Note that, in the present embodiment, it has been described such that the call admission control circuit 37 commands the uplink interference amount acquisition and the control channel receiving level measurement to the control information control circuit 31 and the receiving level information control circuit 27 respectively after the user carried out the call origination operation, but these do not limit the embodiment of the present invention. Besides this, it is possible to consider such a method in which the control information control circuit 31 and the receiving level information control circuit 27 respectively carry out the interference amount acquisition and the control channel receiving level measurement constantly or regularly and store the results in the memory, and the same effect can be obtained by either method.

Also, in the present embodiment, it has been described such that fixed values are stored in the memory for the required quality $(E_b/I_0)_{req}$, $\Delta$, P and $P_{max}$. These may of course be fixedly stored in a ROM (Read Only Memory) or the like of the mobile station, or may be provided to the mobile station from the base station using the broadcast channel similarly as the uplink interference amount information I. Moreover, different ones of these methods may be applied depending on information. In any case, these do not prevent the application of the present invention, and the same effects can be obtained.

Figure 5:
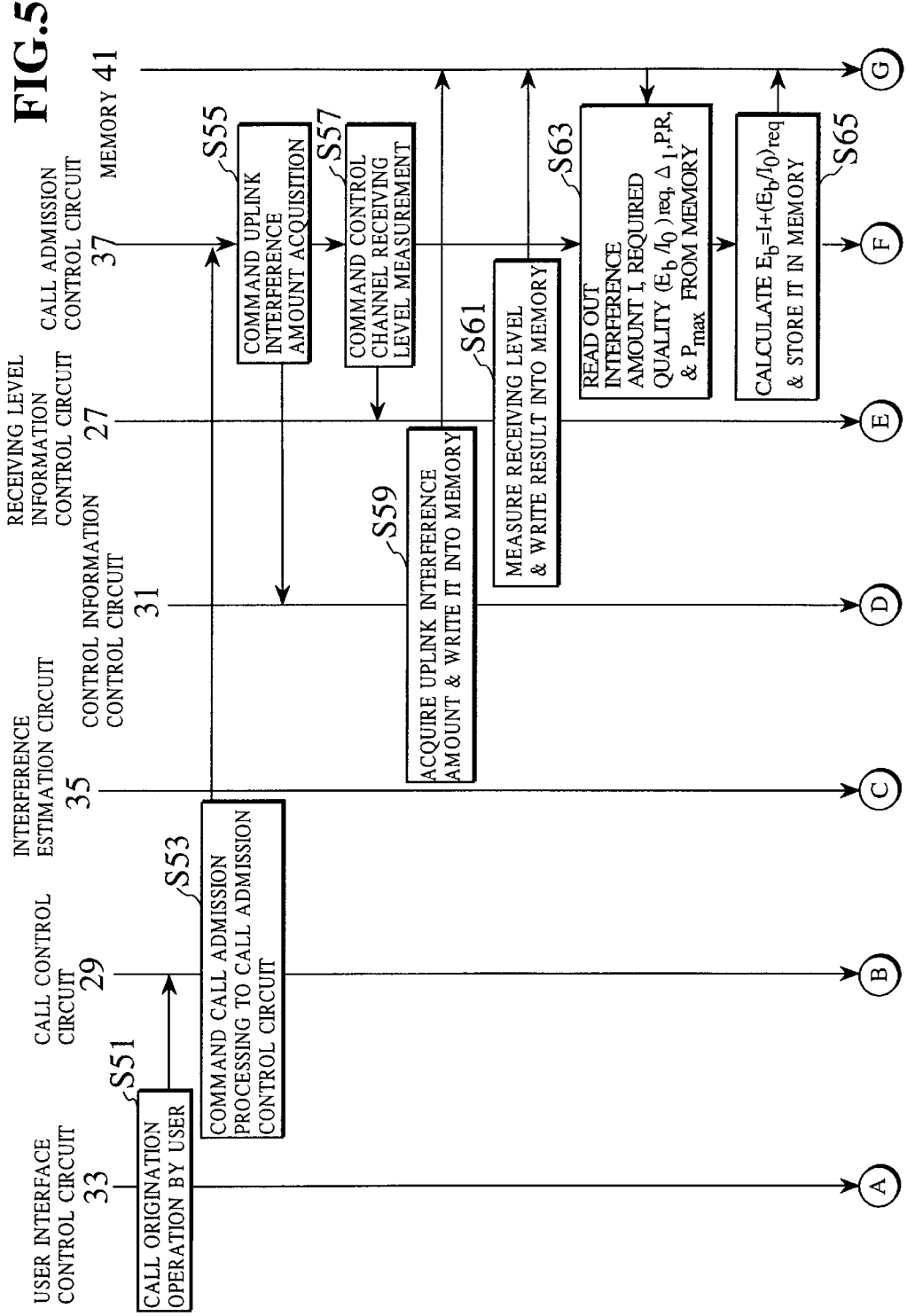
FIG. 5 is a flow chart showing another operation of the mobile station device.
Figure 6:
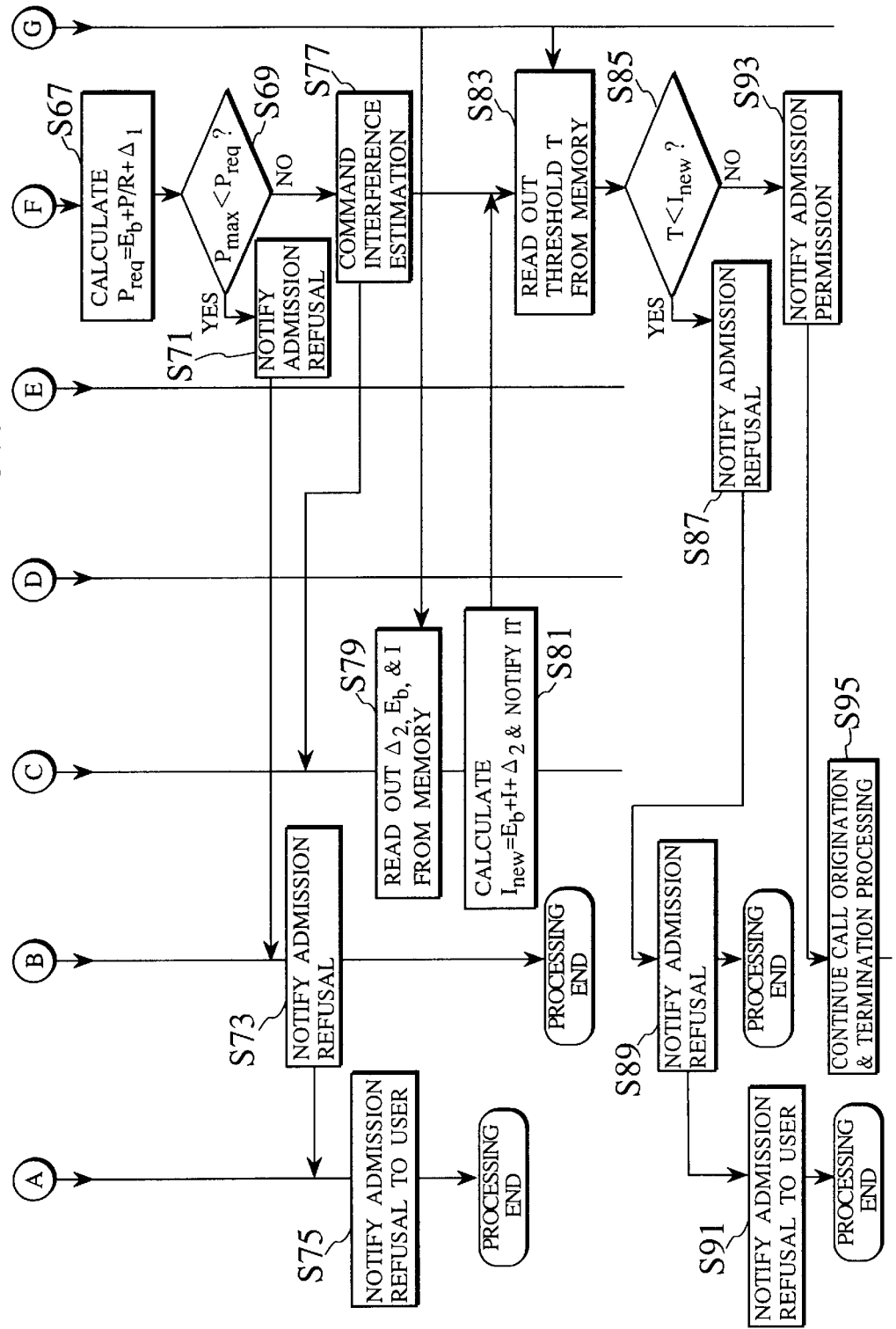
FIG. 6 is a flow chart continuing from FIG. 5 which is showing another operation of the mobile station device.

Next, the processing at the mobile station for calculating the required receiving level, judging whether the own station can satisfy the required communication quality or not according to that, further estimating the uplink interference amount after admission, and judging admission permission/refusal of the own station by comparing this with a prescribed threshold will be described. FIG. 5 and FIG. 6 are a flow chart showing an operation of each circuit within the mobile station, which is showing the case of call origination from the mobile station. In the case of call termination to the mobile station, there are differences such as what activates the call control circuit 39 is not the user interface control circuit 33 but the control information control circuit 31 which detected the paging to the own station, yet a portion related to the call admission permission/refusal judgement is applicable without any change at all, so that the description will be given using an example of the mobile station call origination.

In FIG. 5 and FIG. 6, when the user interface control circuit 33 detects the call origination operation by the user, the user interface control circuit 33 commands the execution of the call control to the call control circuit 39 (step S51). Before executing the control control, the call control circuit 39 commands the call admission processing to the call admission control circuit 37 (step S53). The call admission control circuit 37 commands the uplink interference amount acquisition and the control channel receiving level measurement to the control information control circuit 31 and the receiving level information control circuit 27 respectively (steps S55, S57). The control information control circuit 31 and the receiving level information control circuit 27 that received commands from the call admission control circuit 37 execute the uplink interference amount acquisition and the control channel receiving level measurement respectively, and store the results in the memory 41 (steps S59, S61). After waiting until these are finished, the call admission control circuit 37 reads out from the memory 41 the uplink interference amount I and the control channel receiving level R, as well as a required quality $(E_b/I_0)_{req}$, a transmission power P of the control channel, a first margin $\Delta_1$ for the sake of call admission, and a maximum transmission power $P_{max}$ of the own station (step S63). The call admission control circuit 37 calculates a required energy per bit $E_b$ (required receiving power level) after the own station is admitted, as follows (step S65).

$$E_b = I + (E_b/I_0)_{req} \qquad (3)$$

In addition, the propagation loss between the base station and the mobile station is estimated as P/R, for example, and a required transmission power $P_{req}$ after the own station is admitted is calculated as:

$$P_{req} = E_b + P/R + \Delta_1 \qquad (4)$$

(step S67). $\Delta_1$ is a first margin for the sake of call admission as mentioned above. In the actual mobile communication system, due to the fact that the receiving level measurement value R contains an error and further the fact that characteristics of the uplink propagation path and the downlink propagation path are different in general, $P_{req}$ is also going to contain an error. If $P_{req}$ is evaluated to be smaller, the so called forced disconnection in which a channel is disconnected by force will occur as the required quality cannot be satisfied actually despite of the fact that it is judged as admission permitted by the call admission judgement. The forced disconnection lowers the service performance considerably, so that a margin is introduced in this manner in the present embodiment. However, this does not limit the embodiment of the present invention.

This $P_{req}$ is compared with the maximum transmission power $P_{max}$ of the own station (step S69), and if $P_{max} < P_{req}$, that is, if it is judged that the required quality cannot be satisfied even by the transmission at the maximum transmission power of the own station, the call admission control circuit 37 notifies the admission refusal to the call control circuit 39 (step S71), and further the call control circuit 39 notifies the admission refusal to the user interface control circuit 33 (step S73). The user interface control circuit 33 notifies the admission refusal to the user through the user interface 25 (step S75).

If $P_{max} \geq P_{req}$, the call admission control circuit 37 next commands the estimation of interference amount to the interference estimation circuit 35 (step S77). The interference estimation circuit 35 reads out from the memory 41 the required receiving power level $E_b$, the uplink interference amount I and a second margin $\Delta_2$ (step S79). Then, the uplink interference amount $I_{new}$ after the own station is admitted is calculated as:

$$I_{new} = E_b + I + \Delta_2 \tag{5}$$

and the result is reported to the call admission control circuit 37 (step S81). $\Delta_2$ is a second margin for the sake of call admission as mentioned above. Similarly as in the calculation of $P_{req}$, the calculation of $I_{new}$ is also accompanied by an error so that it is configured to prevent an occurrence of the forced disconnection by introducing $\Delta_2$. However, this does not limit the embodiment of the present invention.

At the call admission control circuit 37, a threshold T for the uplink interference amount is read out from the memory 41 (step S83), and compared with $I_{new}$ (step S85). If $T < I_{new}$, that is, if it is judged that there is a possibility for degrading communications of users who are already carrying out communications as a result of having the own station admitted, the call admission control circuit 37 notifies the admission refusal to the call control circuit 39 (step S87), and further the call control circuit 39 notifies the admission refusal to the user interface control circuit 33 (step S89). The user interface control circuit 33 notifies the admission refusal to the user through the user interface 25 (step S91). If $T \geq I_{new}$, the admission permission is notified to the call control circuit 39 (step S93). The call control circuit 39 continues the call origination and termination processing (step S95).

Note that, in the present embodiment, it has been described such that the call admission control circuit 37 commands the uplink interference amount acquisition and the control channel receiving level measurement to the control information control circuit 31 and the receiving level information control circuit 27 respectively after the user carried out the call origination operation, but these do not limit the embodiment of the present invention. Besides this, it is possible to consider such a method in which the control information control circuit 31 and the receiving level information control circuit 27 respectively carry out the interference amount acquisition and the control channel receiving level measurement constantly or regularly and store the results in the memory, and the same effect can be obtained by either method. Also, in the present embodiment, it has been described such that fixed values are stored in the memory for the required quality $(E_b/I_0)_{req}$, $\Delta$, P, $P_{max}$ and T. These may of course be fixedly stored in a ROM (Read Only Memory) or the like of the mobile station, or may be provided to the mobile station from the base station using the broadcast channel similarly as the uplink interference amount information I. Moreover, different ones of these methods may be applied depending on information. In any case, these do not prevent the application of the present invention, and the same effects can be obtained.

Figure 7:
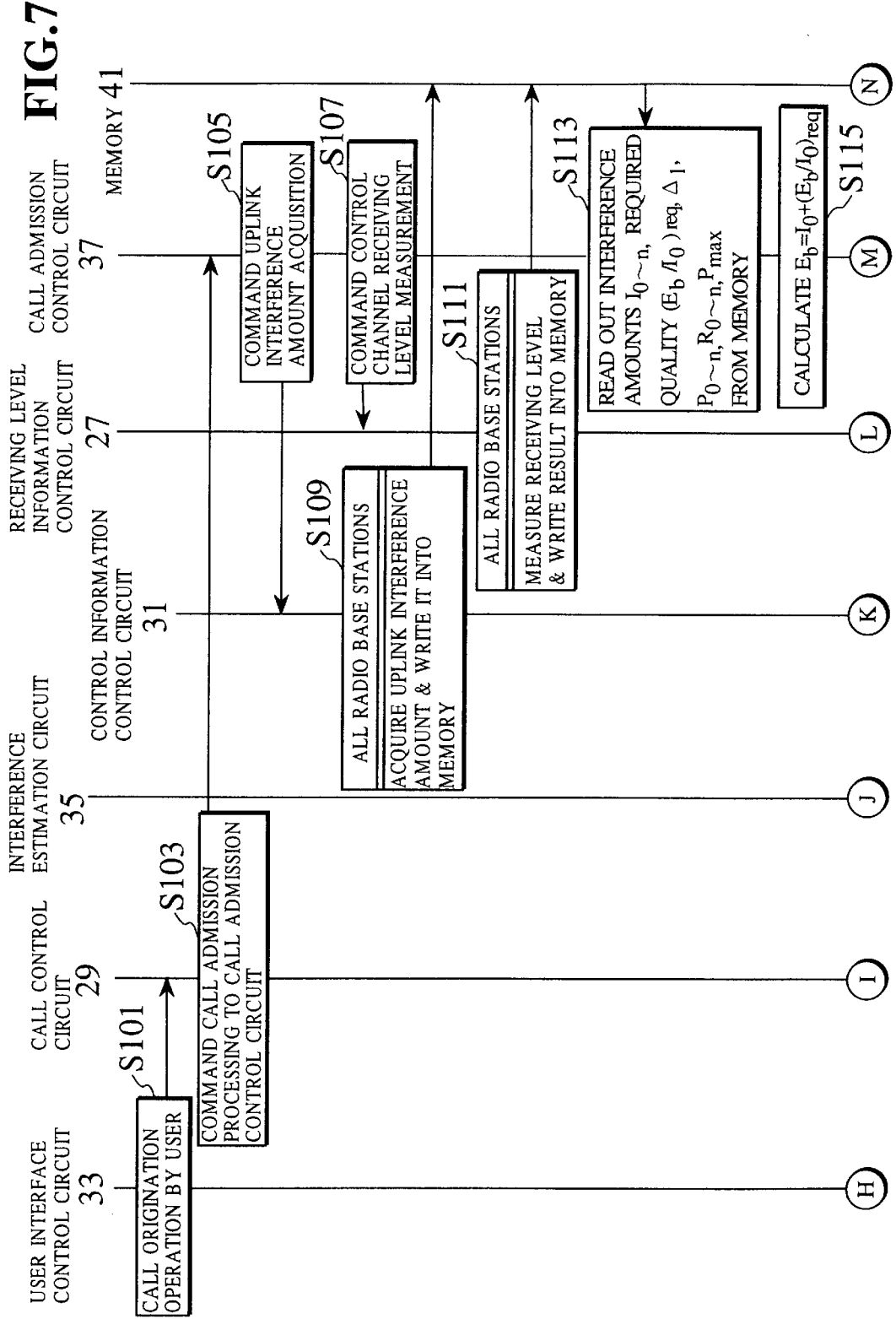
FIG. 7 is a flow chart showing still another operation of the mobile station device.
Figure 8:
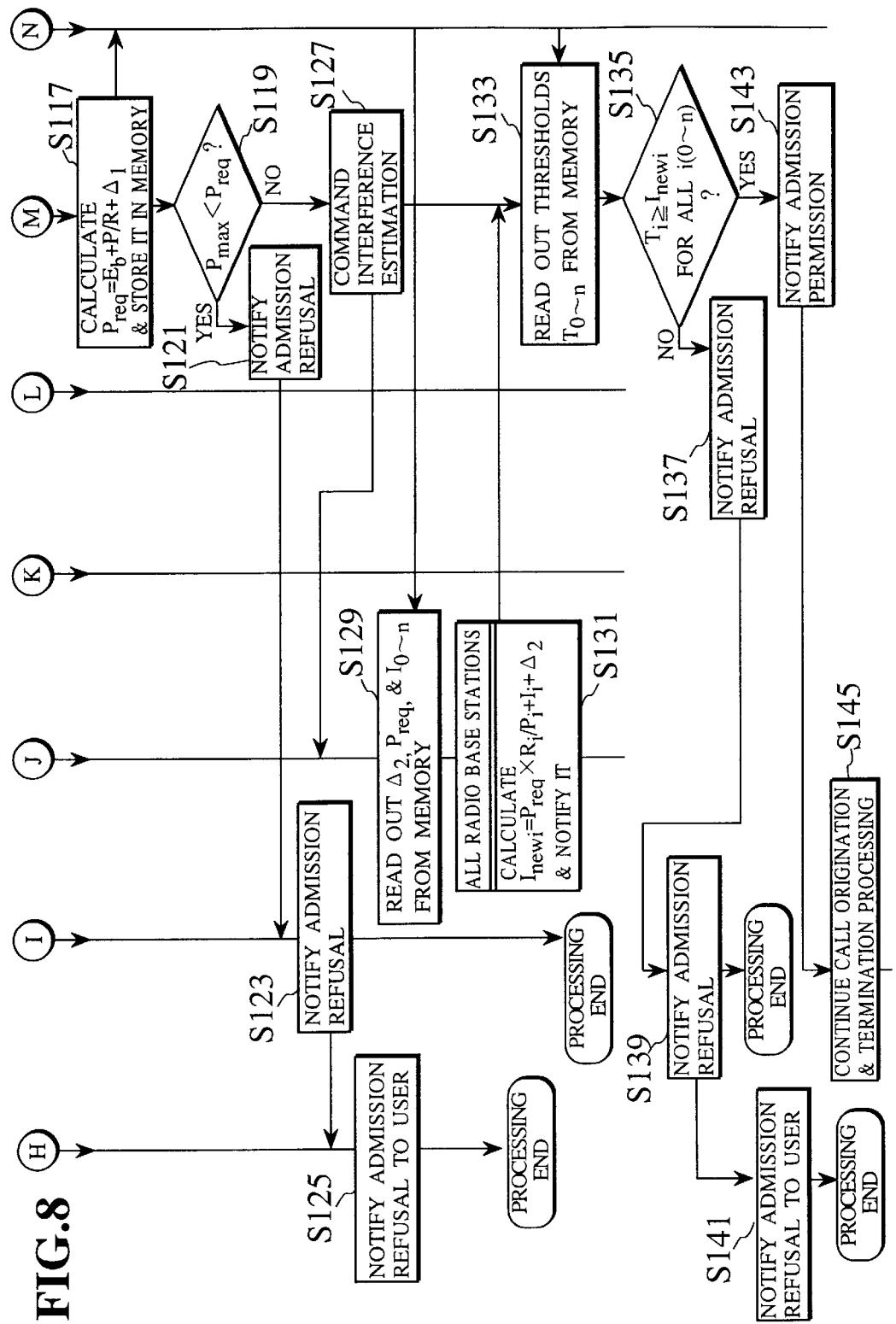
FIG. 8 is a flow chart continuing from FIG. 5 which is showing still another operation of the mobile station device.

Next, the processing at the mobile station for calculating the required receiving level, judging whether the own station can satisfy the required communication quality or not according to that, further estimating the uplink interference amount after admission, comparing this with a prescribed threshold, estimating the interference to be given to surrounding radio base stations that is expected in the case where the own station is admitted to the connection target radio base station, and judging admission permission/refusal of the own station by comparing this with a prescribed threshold will be described. FIG. 7 and FIG. 8 are a flow chart showing an operation of each circuit within the mobile station, which is showing the case of call origination from the mobile station. In the case of call termination to the mobile station, there are differences such as what activates the call control circuit 39 is not the user interface control circuit 33 but the control information control circuit 31 which detected the paging to the own station, yet a portion related to the call admission permission/refusal judgement is applicable without any change at all, so that the description will be given using an example of the mobile station call origination.

In FIG. 7 and FIG. 8, when the user interface control circuit 33 detects the call origination operation by the user, the user interface control circuit 33 commands the execution of the call control to the call control circuit 39 (step S101). Before executing the control control, the call control circuit 39 commands the call admission processing to the call admission control circuit 37 (step S103). The call admission control circuit 37 commands the uplink interference amount acquisition and the control channel receiving level measurement to the control information control circuit 31 and the receiving level information control circuit 27 respectively (steps S105, S107). The control information control circuit 31 and the receiving level information control circuit 27 that received commands from the call admission control circuit 37 execute the uplink interference amount acquisition and the control channel receiving level measurement respectively, for the connection target radio base station (0) and surrounding radio base stations (1-n), and store the results in the memory 41 (steps S109, S111). As a method for the mobile station to learn surrounding radio base stations of the connection target radio base station, various methods can be considered. For example, it is possible to consider a method in which surrounding radio base stations are notified from the connection target radio base station to the mobile station or a method in which the mobile station autonomously scans the control channels of surrounding radio base stations and sets those radio base stations with a certain receiving level or above as surrounding base stations. In either method, the present invention is applicable and the same effects can be obtained.

After waiting until these are finished, the call admission control circuit 37 reads out from the memory 41 the uplink interference amounts $I_{0-n}$ and the control channel receiving levels $R_{0-n}$ of the connected target and surrounding radio base stations (0 to n), as well as a required quality $(E_b/I_0)_{req}$, transmission powers $P_{0-n}$ of the control channels, a first margin $\Delta_1$ for the sake of call admission, and a maximum transmission power $P_{max}$ of the own station (step S113). The call admission control circuit 37 calculates a required energy per bit $E_b$ (required receiving power level) after the own station is admitted, as follows (step S115).

$$E_b = I + (E_b/I_0)_{req} \tag{6}$$

In addition, the propagation loss between the base station and the mobile station is estimated as $P_0/R_0$, for example, and a required transmission power $P_{req}$ after the own station is admitted is calculated as:

$$P_{req} = E_b + P_0/R_0 + \Delta_1 \tag{7}$$

(step S117). $\Delta_1$ is a first margin for the sake of call admission as mentioned above. In the actual mobile communication system, due to the fact that the receiving level measurement value R contains an error and further the fact that characteristics of the uplink propagation path and the downlink propagation path are different in general, $P_{req}$ is also going to contain an error. If $P_{req}$ is evaluated to be smaller, the so called forced disconnection in which a channel is disconnected by force will occur as the required quality cannot be satisfied actually despite of the fact that it is judged as admission permitted by the call admission judgement. The forced disconnection lowers the service performance considerably, so that a margin is introduced in this manner in the present embodiment. However, this does not limit the embodiment of the present invention.

This $P_{req}$ is compared with the maximum transmission power $P_{max}$ of the own station (step S119), and if $P_{max} < P_{req}$, that is, if it is judged that the required quality cannot be satisfied even by the transmission at the maximum transmission power of the own station, the call admission control circuit 37 notifies the admission refusal to the call control circuit 39 (step S121), and further the call control circuit 39 notifies the admission refusal to the user interface control circuit 33 (step S123). The user interface control circuit 33 notifies the admission refusal to the user through the user interface 25 (step S125).

If $P_{max} \geq P_{req}$, the call admission control circuit 37 next commands the estimation of interference amount to the interference estimation circuit 35 (step S127). The interference estimation circuit 35 reads out from the memory 41 the required transmission power $P_{req}$, the uplink interference amounts $I_{0-n}$ and a second margin $\Delta_2$ (step S129). Then, the uplink interference amount $I_{newi}$ after the own station is admitted is calculated as:

$$I_{newi} = P_{req} \times R_i/P_i + I_i + \Delta_2 \qquad (8)$$

and the result is reported to the call admission control circuit 37 (step S131). $\Delta_2$ is a second margin for the sake of call admission as mentioned above. Similarly as in the calculation of $P_{req}$, the calculation of $I_{new}$ is also accompanied by an error so that it is configured to prevent an occurrence of the forced disconnection by introducing $\Delta_2$. However, this does not limit the embodiment of the present invention. At the call admission control circuit 37, thresholds $T_{0-n}$ for the uplink interference amounts are read out from the memory 41 (step S133), and compared with $I_{new0-n}$ (step S135). If $T_i \geq I_{newi}$ for all i (i=0 to n), the admission permission is notified to the call control circuit 39 (step S143). The call control circuit 39 continues the call origination and termination processing (step S145). Otherwise, it is judged that there is a possibility for degrading communications of users who are already carrying out communications as a result of having the own station admitted, the call admission control circuit 37 notifies the admission refusal to the call control circuit 39 (step S137), and further the call control circuit 39 notifies the admission refusal to the user interface control circuit 33 (step S139). The user interface control circuit 33 notifies the admission refusal to the user through the user interface 25 (step S141).

Note that, in the present embodiment, it has been described such that the call admission control circuit 37 commands the uplink interference amount acquisition and the control channel receiving level measurement to the control information control circuit 31 and the receiving level information control circuit 27 respectively after the user carried out the call origination operation, but these do not limit the embodiment of the present invention. Besides this, it is possible to consider such a method in which the control information control circuit 31 and the receiving level information control circuit 27 respectively carry out the interference amount acquisition and the control channel receiving level measurement constantly or regularly and store the results in the memory, and the same effect can be obtained by either method. Also, in the present embodiment, it has been described such that fixed values are stored in the memory for the required quality $(E_b/I_0)_{req}$, $\Delta$, P, $P_{max}$ and T. These may of course be fixedly stored in a ROM (Read Only Memory) or the like of the mobile station, or may be provided to the mobile station from the base station using the broadcast channel similarly as the uplink interference amount information I. Moreover, different ones of these methods may be applied depending on information. In any case, these do not prevent the application of the present invention, and the same effects can be obtained. Also, as for the second margin 2 for the sake of call admission, it has been described such that the common value is used for all the radio base stations, but there is no need for them to be common, and setting of a different value for each base station does not affect the application and the effects of the present invention at all.

Next, the processing for broadcasting the call admission information from the base station, taking out that information at the mobile station, and judging the call admission permission/refusal will be described. The present embodiment describes a case where the call admission information is formed by an information indicating admission permission/refusal, a case where it is formed by the uplink interference amount at the base station and a threshold, a case where it is formed by a remaining capacity calculated from the uplink interference amount, a case where it is formed by a transmission power value of the base station and a threshold, a case where it is formed by a remaining capacity calculated from the transmission power of the base station, a case where it is formed by the number of spread codes or the number of hardware resources that are currently used within the base station and a threshold corresponding to them, and a case where it is formed by a remaining capacity calculated from the number of spread codes or the number of hardware resources that are currently used within the base station. In these cases, only the content of information acquired at the mobile station and the admission permission/refusal judgement criterion based on it are different, and the flow of the operation is the same. Here, the hardware resources stands for devices that carry out processing of information transmitted in correspondence to transmission rates of individual users, which are implemented in the base station. It is an element that constitute the base station transmission and reception device in FIG. 2, and a plurality of hardware resources are implemented according to a scale of the base station. Each user carries out communications by having one or plural of these hardware resources allocated thereto. The available hardware resources are limited by the number that is implemented, and the number of hardware resources that are currently implemented will be used as a threshold, for example. Else, the number of implemented hardware resources minus the number of hardware resources that are currently used will be used as a remaining capacity, for example. Also, the spread codes are used for communications between the base stations and the mobile stations. The mobile station carries out communications by having one or plural of the spread codes allocated thereto. For the spread codes, there is a limit to the number of spread codes that can be generated depending on the code length (the number of bits), and this limit value for the number of codes will be used as a threshold, for example. Else, the limit for the number of codes minus the number of spread codes that are currently used will be used as a remaining capacity, for example.

FIG. 9 is a flow chart showing an operation of each circuit within the mobile station. FIG. 9 is showing the case of call origination from the mobile station. In the case of call termination to the mobile station, there are differences such as what activates the call control circuit 39 is not the user interface control circuit 33 but the control information control circuit 31 which detected the paging to the own station, yet a portion related to the call admission permission/refusal judgement is applicable without any change at all, so that the description will be given using this example of the mobile station call origination.

When the user interface control circuit 33 detects the call origination operation by the user, the user interface control circuit 33 commands the execution of the call control to the call control circuit 39 (step S151). Before executing the control control, the call control circuit 39 commands the call admission processing to the call admission control circuit 37 (step S153). The call admission control circuit 37 commands the call admission information acquisition to the control information control circuit 31 (step S155). The control information control circuit 31 that received command from the call admission control circuit 37 executes the call admission information acquisition, and stores the result in the memory 41 (step S157). After waiting until these are finished, the call admission control circuit 37 reads out the call admission information from the memory 41 (step S159).

Then, the admission permission/refusal is judged according to the read out call admission information (step S161), and if it is judged as admission refused, the call admission control circuit 37 notifies the admission refusal to the call control circuit 39 (step S163), and further the call control circuit 39 notifies the admission refusal to the user interface control circuit 33 (step S165). The user interface control circuit 33 notifies the admission refusal to the user through the user interface 25 (step S167). When it is judged as admission permitted, the call admission control circuit 37 notifies the admission permission to the call control circuit 39 (step S169). The call control circuit 39 continues the call origination and termination processing (step S171).

The call admission judgement is carried out according to the content of information acquired by the control information control circuit 31 as follows. In the case where the call admission information is formed by an information indicating admission permission/refusal, the call admission is judged by checking whether the acquired call admission information indicates admission permission or admission refusal. In the case where it is formed by the uplink interference amount at the base station and a threshold, the acquired uplink interference amount and the acquired threshold are compared and it is judged as admission permitted if the uplink interference amount is less than the threshold, or as admission refused otherwise. In the case where it is formed by a remaining capacity calculated from the uplink interference amount, it is judged as admission permitted if the acquired remaining capacity is greater than 0, or as admission refused otherwise. In the case where it is formed by a transmission power value of the base station and a threshold, the acquired transmission power value and the acquired threshold are compared and it is judged as admission permitted if the transmission power value is less than the threshold, or as admission refused otherwise. In the case where it is formed by a remaining capacity calculated from the transmission power of the base station, it is judged as admission permitted if the acquired remaining capacity is greater than 0, or as admission refused otherwise. In the case where it is formed by the number of spread codes or the number of hardware resources that are currently used within the base station and a threshold corresponding to them, the acquired number of spread codes or hardware resources and the acquired threshold are compared and it is judged as admission permitted if the number of spread codes or hardware resources is less than the threshold, or as admission refused otherwise. In the case where it is formed by a remaining capacity calculated from the number of spread codes or the number of hardware resources that are currently used within the base station, it is judged as admission permitted if the acquired remaining capacity is greater than 0, or as admission refused otherwise.

Here, in the comparison of the measured value and the threshold, it is judged as admission permitted when the measured value is less than the threshold, but it is perfectly all right to judge it as admission permitted when the measured value is less than or equal to the threshold. Also, it is judged as admission permitted when the remaining capacity is greater than 0, but it is perfectly all right to judge it as admission permitted when the remaining capacity is greater than or equal to 0. In these cases, it suffices to change the threshold to be set, and it does not affect the embodiment of the present invention at all.

Note that, in the present embodiment, it has been described such that the call admission control circuit 37 commands the call admission information acquisition to the control information control circuit 31 after the user carried out the call origination operation, but these do not limit the embodiment of the present invention. Besides this, it is possible to consider such a method in which the control information control circuit 31 carries out the call admission information acquisition constantly or regularly and stores the result in the memory, and the same effect can be obtained by either method.

As described above, according to the present invention, a radio base station has means for broadcasting a call admission information indicating a state of own station regarding admission of a new call using a broadcast channel, and a mobile station has means for acquiring said call admission information which is broadcast from a connection target radio base station through the broadcast channel, and judges admission permission/refusal of said mobile station according to this acquired call admission information, so that it is possible to reduce the control signal traffic between the base station and the mobile station, and it is possible to prevent congestion of the control channel that is commonly used by a plurality of mobile stations for the purpose of communications with the base stations, while preventing degradation of communication qualities of other users who are already connected with the base stations and in communication.

Also, according to the present invention, the mobile station also has means for acquiring the call admission information at respective radio base stations which are broadcast from surrounding radio base stations of the connection target radio base station through broadcast channels transmitted by respective radio base stations, and uses these acquired call admission information in judging admission permission/refusal of said mobile station in addition, so that it is possible to further reduce the control signal traffic between the base station and the mobile station, while preventing degradation of communication qualities of users who are already connected with surrounding base stations of the connection target base station and in communication.

Also, according to the present invention, the radio base station has means for measuring an uplink interference amount at own base station, and the call admission information is formed at least by said measured uplink interference amount at own base station, and the mobile station has means for calculating a required receiving level at the radio base station that is expected in a case where it is admitted to the connection target radio base station, according to the interference amount acquired from the broadcast channel, and judges that admission of said mobile station is refused in a case where it is judged that own station cannot satisfy a required communication quality, according to said acquired uplink interference amount and said calculated required receiving level, so that it is possible to reduce the control signal traffic between the base station and the mobile station, and it is possible to prevent congestion of the control channel that is commonly used by a plurality of mobile stations for the purpose of communications with the base stations, while preventing degradation of communication qualities of other users who are already connected with the base stations and in communication.

Also, according to the present invention, the mobile station estimates an uplink interference amount after said mobile station is admitted, from the uplink interference amount at the base station and the required receiving level that is expected in a case where said mobile station is admitted, and judges that admission of said mobile station is refused in a case where this estimated uplink interference amount after admission exceeds a prescribed threshold, so that it is possible to reduce the control signal traffic between the base station and the mobile station, while preventing degradation of communication qualities of users who are already connected with the connection target base station and in communication.

Furthermore, according to the present invention, the radio base station has means for measuring an uplink interference amount at own base station, and the call admission information is formed at least by said measured uplink interference amount at own base station, and the mobile station calculates an interference amount to be given to surrounding base stations that is expected in a case where said mobile station is admitted to the connection target radio base station, according to a required receiving level at the connection target radio base station that is expected in a case where it is admitted to the connection target radio base station, estimates an uplink interference amount at surrounding base stations after said mobile station is admitted to the connection target radio base station, from said acquired uplink interference amount at surrounding base stations, and said calculated interference amount to be given to surrounding base stations, and judges that admission of said mobile station is refused when this estimated uplink interference amount at surrounding base stations exceeds a prescribed threshold, so that it is possible to reduce the control signal traffic between the base station and the mobile station, while preventing degradation of communication qualities of users who are already connected with the connection target base station and in communication.

What is claimed is:

1. A call admission control method for a CDMA mobile communication that controls admission of calls for a frequency bandwidth shared by a plurality of mobile stations which carry out communications with radio base stations by a code division multiple access, the call admission control method for a CDMA mobile communication system characterized in that:
   a radio base station broadcasts a call admission information, without request from the mobile station, indicating a state of own station regarding admission of a new call using a broadcast channel,
   a mobile station acquires from a connection target information which is broad cast from a connection target radio base station through the broadcast channel, and judges admission permission/refusal of said mobile station according to this acquired call admission information, and
   said mobile station carries out a call processing operation with respect to said radio base station when it is judged that admission is permitted, and the mobile station terminates the call processing operation when it is judged that admission is refused.

2. The call admission control method for a CDMA mobile communication system as described in claim 1, characterized in that the mobile station acquires the call admission information at respective radio base stations which are broadcast from surrounding radio base stations of the connection target radio base station through broadcast channels transmitted by respective radio base stations, and uses these acquired call admission information in judging admission permission/refusal of said mobile station.

3. The call admission control method for a CDMA mobile communication system as described in claim 1 or 2, characterized in that the call admission information indicates either permission or refusal regarding admission of a new call at own radio base station.

4. The call admission control method for a CDMA mobile communication system as described in claim 1 or 2, characterized in that the radio base station measures an uplink interference amount at own base station, and the call admission information is formed at least by said measured uplink interference amount and a prescribed threshold.

5. The call admission control method for a CDMA mobile communication system as described in claim 1 or 2, characterized in that the radio base station measures an uplink interference amount at own base station and calculates a remaining capacity at own base station according to this measured uplink interference amount, and the call admission information indicates at least this calculated remaining capacity.

6. The call admission control method for a CDMA mobile communication system as described in claim 1, characterized in that the radio base station measures an uplink interference amount at own base station, and the call admission information is formed at least by said measured uplink interference amount at own base station, and
   the mobile station calculates a required receiving level at the radio base station that is expected in a case where it is admitted to the connection target radio base station, according to the interference amount acquired from the broadcast channel, and judges that admission of said mobile station is refused in a case where it is judged that own station cannot satisfy a required communication quality, according to said acquired uplink interference amount and said calculated required receiving level.

7. The call admission control method for a CDMA mobile communication system as described in claim 6, characterized in that the mobile station estimates an uplink interference amount after said mobile station is admitted, from the uplink interference amount at the base station and the required receiving level that is expected in a case where said mobile station is admitted, and judges that admission of said mobile station is refused in a case where this estimated uplink interference amount after admission exceeds a prescribed threshold.

8. The call admission control method for a CDMA mobile communication system as described in claim 6 or 7, characterized in that the radio base station measures an uplink interference amount at own base station, and the call admission information is formed at least by said measured uplink interference amount at own base station, and
   the mobile station calculates an interference amount to be given to surrounding base stations that is expected in a case where said mobile station is admitted to the connection target radio base station, according to a required receiving level at the connection target radio base station that is expected in a case where it is admitted to the connection target radio base station, estimates an uplink interference amount at surrounding base stations after said mobile station is admitted to the connection target radio base station, from said acquired uplink interference amount at surrounding base stations, and said calculated interference amount to be given to surrounding base stations, and judges that admission of said mobile station is refused when this estimated uplink interference amount at surrounding base stations exceeds a prescribed threshold.

9. The call admission control method for a CDMA mobile communication system as described in claim 1 or 2, characterized in that the radio base station measures a transmission power of own base station, and the call admission information is formed at least by said measured transmission power value of the radio base station and a prescribed threshold.

10. The call admission control method for a CDMA mobile communication system as described in claim 1 or 2, characterized in that the radio base station measures a transmission power of own base station and calculates a remaining capacity at own base station according to said measured transmission power value of the radio base station, and the call admission information indicates at least this calculated remaining capacity.

11. The call admission control method for a CDMA mobile communication system as described in claim 1 or 2, characterized in that the call admission information is formed at least by a number of spread codes currently used within own radio base station or a number of hardware resources currently used within own radio base station, and a threshold corresponding to them.

12. The call admission control method for a CDMA mobile communication system as described in claim 1 or 2, characterized in that the radio base station calculates a remaining capacity at own base station according to a number of spread codes currently used within own radio-base station or a number of hardware resources currently used within own radio base station, and the call admission information indicates at least this calculated remaining capacity.

13. A mobile station device in a CDMA mobile communication system for controlling admission of calls for a frequency bandwidth shared by a plurality of mobile stations which carry out communications with radio base stations by a code division multiple access, the mobile station device for a CDMA mobile communication system characterized by having:

acquisition means for acquiring a call admission information indicating a state regarding admission of a new call at a radio base station which is broadcast from a connection target radio base station through a broadcast channel without request from the mobile station, judging means for judging admission permission/refusal of said mobile station according to this acquired call admission information, and call processing terminating means for carrying out a call processing operation at said mobile station with respect to said radio base station when it is judged that admission is permitted, and for terminating the call processing operation when it is judged that admission is refused.

14. The mobile station device for a CDMA mobile communication system as described in claim 13, characterized in that the acquisition means also acquires the call admission information at respective radio base stations which are broadcast from surrounding base stations of the connection target radio base stations through broadcast channels transmitted by respective base stations.

15. The mobile station device for a CDMA mobile communication system as described in claim 13, characterized in that the acquisition means acquires an uplink interference amount from the call admission information which is broadcast from the connection target radio base station, and the judging means calculates a required receiving level at the radio base station that is expected in a case where it is admitted to the connection target radio base station, according to the interference amount acquired from the broadcast channel, and judges that admission of said mobile station is refused in a case where it is judged that own station cannot satisfy a required communication quality, according to said acquired uplink interference amount and said calculated required receiving level.

16. The mobile station device for a CDMA mobile communication system as described in claim 15, characterized in that the judging unit estimates an uplink interference amount after said mobile station is admitted, from the uplink interference amount at the base station and the required receiving level that is expected in a case where the mobile station is admitted, and judges that admission of said mobile station is refused in a case where this estimated uplink interference amount after admission exceeds a prescribed threshold.

17. The mobile station device for a CDMA mobile communication system as described in claim 15 or 16, characterized in that the acquisition means acquires an uplink interference amount at the base station from the call admission information that is broadcast through the broadcast channel, and the judging unit calculates an interference amount to be given to surrounding base stations that is expected in a case where said mobile station is admitted to the connection target radio base station, according to a required receiving level at the connection target radio base station that is expected in a case where it is admitted to the connection target radio base station, estimates an uplink interference amount at surrounding base stations after said mobile station is admitted to the connection target radio base station, from said acquired uplink interference amount at surrounding base stations, and said calculated interference amount to be given to surrounding base stations, and judges that admission of said mobile station is refused when this estimated uplink interference amount at surrounding base stations exceeds a prescribed threshold.

* * * * *